US012689861B2

(12) United States Patent
Ho

(10) Patent No.: US 12,689,861 B2
(45) Date of Patent: Jul. 21, 2026

(54) BONE CONDUCTION ASSISTIVE HEARING AID

(71) Applicant: OXTI Pte Ltd, Singapore (SG)

(72) Inventor: Chih-Feng Ho, Singapore (SG)

(73) Assignee: OXTI PTE LTD, Singapore (SG)

( * ) Notice: Subject to any disclaimer, the term of this patent is extended or adjusted under 35 U.S.C. 154(b) by 160 days.

(21) Appl. No.: 18/830,607

(22) Filed: Sep. 11, 2024

(65) Prior Publication Data

US 2026/0075372 A1 Mar. 12, 2026

(51) Int. Cl.

| | |
|---|---|
| ***H04R 25/00*** | (2006.01) |
| ***H04R 1/10*** | (2006.01) |
| ***H04R 25/02*** | (2006.01) |

(52) U.S. Cl.

CPC .......... *H04R 25/607* (2019.05); *H04R 1/105* (2013.01); *H04R 25/02* (2013.01); *H04R 25/606* (2013.01); *H04R 2225/021* (2013.01); *H04R 2225/0213* (2019.05); *H04R 2225/0216* (2019.05); *H04R 2460/13* (2013.01)

(58) Field of Classification Search

CPC ...... H04R 1/105; H04R 25/02; H04R 25/606; H04R 25/607; H04R 2225/021; H04R 2225/0213; H04R 2225/0216; H04R 2460/13

See application file for complete search history.

(56) References Cited

U.S. PATENT DOCUMENTS

| | | | | |
|---|---|---|---|---|
| 7,013,018 | B2 * | 3/2006 | Bogeskov-Jensen ... | H04M 1/05 381/381 |
| 10,542,351 | B2 * | 1/2020 | Good ..................... | H04R 25/02 |
| 2026/0075373 | A1 * | 3/2026 | Ho ....................... | H04R 25/607 |

* cited by examiner

*Primary Examiner* — Huyen D Le
(74) *Attorney, Agent, or Firm* — Leong C. Lei

(57) ABSTRACT

Disclosed is a bone conduction assistive hearing aid, including a main body, which includes a hearing aid mechanism and an adhesive layer. One side of the adhesive layer is provided with ventilation holes that penetrate through the adhesive layer. The bottom end of the adhesive layer is provided with a rubber bent rod, in which a flexible metal wire is arranged. One end of the rubber bent rod is provided with a docking hole, and a spherical hole at one end of the docking hole. An elastic column is insertable into the docking hole and has one end formed with an elastic ball receivable in the spherical hole. An opposite end of the elastic column includes a rubber plug, which is covered with a breathable mesh layer.

6 Claims, 3 Drawing Sheets

BONE CONDUCTION ASSISTIVE HEARING AID

BACKGROUND OF THE INVENTION

(a) Technical Field of the Invention

The present invention relates to the field of hearing aid technology, specifically to a bone conduction assistive hearing aid.

(b) Description of the Prior Art

As is well known, hearing aids are auxiliary devices used by individuals with hearing impairments to compensate for hearing loss, thereby improving their ability to communicate with others. These tools, equipment, devices, and instruments can broadly be considered hearing aids as long as they effectively transmit sound to the ear. From the perspective of wearing position and shape, hearing aids can be categorized into behind-the-ear (BTE) hearing aids, in-the-ear (ITE) hearing aids, in-the-canal (ITC) hearing aids, and completely-in-the-canal (CIC) hearing aids.

Existing behind-the-ear bone conduction hearing aids have poor adhesion when worn. When the wearer is in motion, these bone conduction hearing aids tend to loosen and are prone to falling off.

SUMMARY OF THE INVENTION

To address the shortcomings of the existing technology, the present invention provides a bone conduction assistive hearing aid.

To achieve the above objective, the present invention provides the following technical solution. A bone conduction assistive hearing aid comprises a main body. The main body comprises a hearing aid mechanism and an adhesive layer. One side of the adhesive layer is formed with one or more ventilation holes that penetrate through the adhesive layer. A bottom end of the adhesive layer is provided with a rubber bent rod, and a flexible metal wire is arranged in the interior of the rubber bent rod. One end of the rubber bent rod is provided with a docking hole, and a spherical hole at one end of the docking hole. An elastic column is insertable into the docking hole, and one end of the elastic column is provided with an elastic ball that is receivable in the spherical hole. An opposite end of the elastic column comprises a rubber plug, and a breathable mesh layer is arranged on an outer side of rubber plug to cover the rubber plug. A top end of the rubber bent rod is formed with a threaded hole that communicates with the spherical hole. A top end of the elastic ball is formed with a docking groove. A bolt is receivable in and engageable with threaded hole.

To improve the fastening effect, the present invention is structured such that a bottom end of the bolt is provided with a tapered head of a cone shape, which contacts against the docking hole.

To prevent injury from being caused by accidental hitting of the bolt, the present invention is structured such that a top end of the bolt is provided with a rubber cap, and an adhesive layer is provided between the rubber cap and the bolt.

To enhance insulation, the present invention is structured such that an insulating sleeve is provided between the adhesive layer and the hearing aid mechanism.

To improve corrosion resistance, the present invention is structured such that the bolt is coated with an anti-corrosion coating.

To facilitate locating of the device in a dimly condition, the present invention is structured such that an outer side of the rubber bent rod is provided with a reflective strip.

Compared to existing technology, the bone conduction assistive hearing aid according to the present invention provides the following advantages:

In the bone conduction assistive hearing aid of the present invention, a user positions the docking groove of the elastic ball to face upward and inserts the elastic ball into the docking hole. This makes the elastic ball compressed for subsequentially move into and position in the spherical hole, allowing the elastic column to fit into the docking hole. The bolt is then screwed into the threaded hole, with the bottom end of the bolt pressing against the docking groove at the top of the elastic ball, securing the elastic ball in the spherical hole.

The adhesive layer attaches the main body to the back of an ear of the user, with the hearing aid mechanism placed at a designated position on the head of the user. The hearing aid mechanism includes common components of bone conduction hearing aids, such as the vibrator assembly and battery, which are not detailed here.

The user grips the rubber bent rod and moves it to the front of the ear. The flexible metal wire inside the rubber bent rod helps it return to its original shape. The rubber plug at the end of the elastic column is pressed into the ear canal of the user, similar to where the headset would be worn. The breathable mesh layer on the rubber plug improves ventilation, ensuring a tighter and more secure fit of the main body to the back of the ear. This prevents the main body from loosening or falling off during movement, addressing the issue of poor adhesion and instability that is common in existing bone conduction hearing aids.

DETAILED DESCRIPTION OF THE PREFERRED EMBODIMENTS

Figure 1:
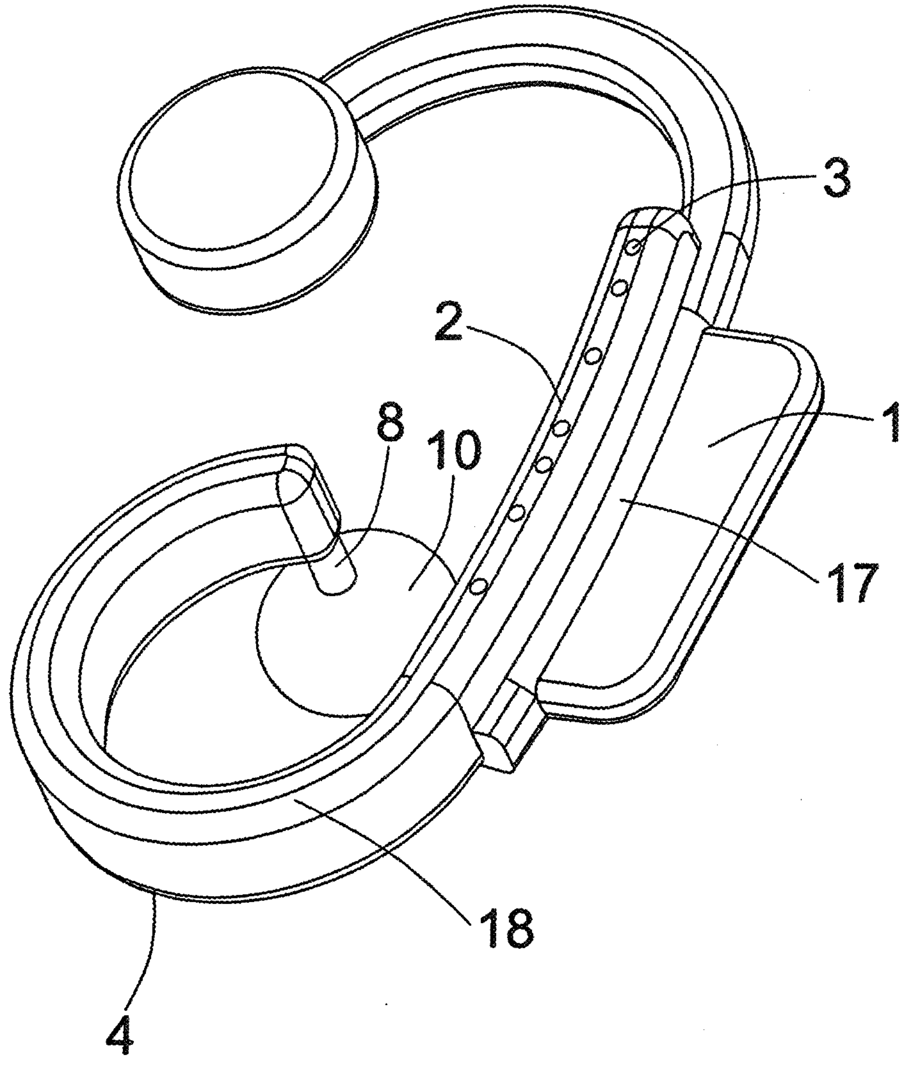
FIG. 1 is a schematic view showing a structure of the present invention.
Figure 2:
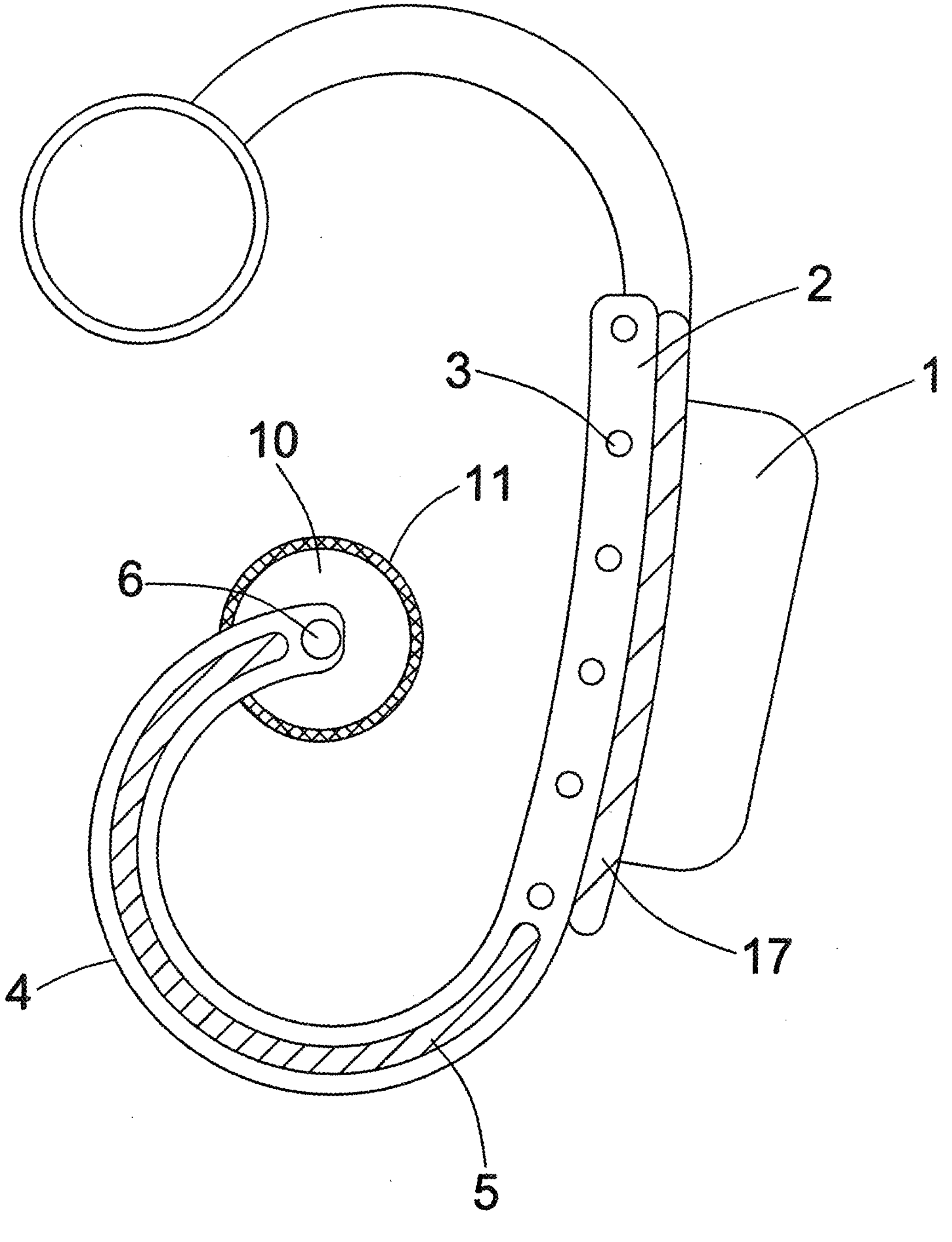
FIG. 2 is a front view, partly sectioned, showing the structure of the present invention.
Figure 3:
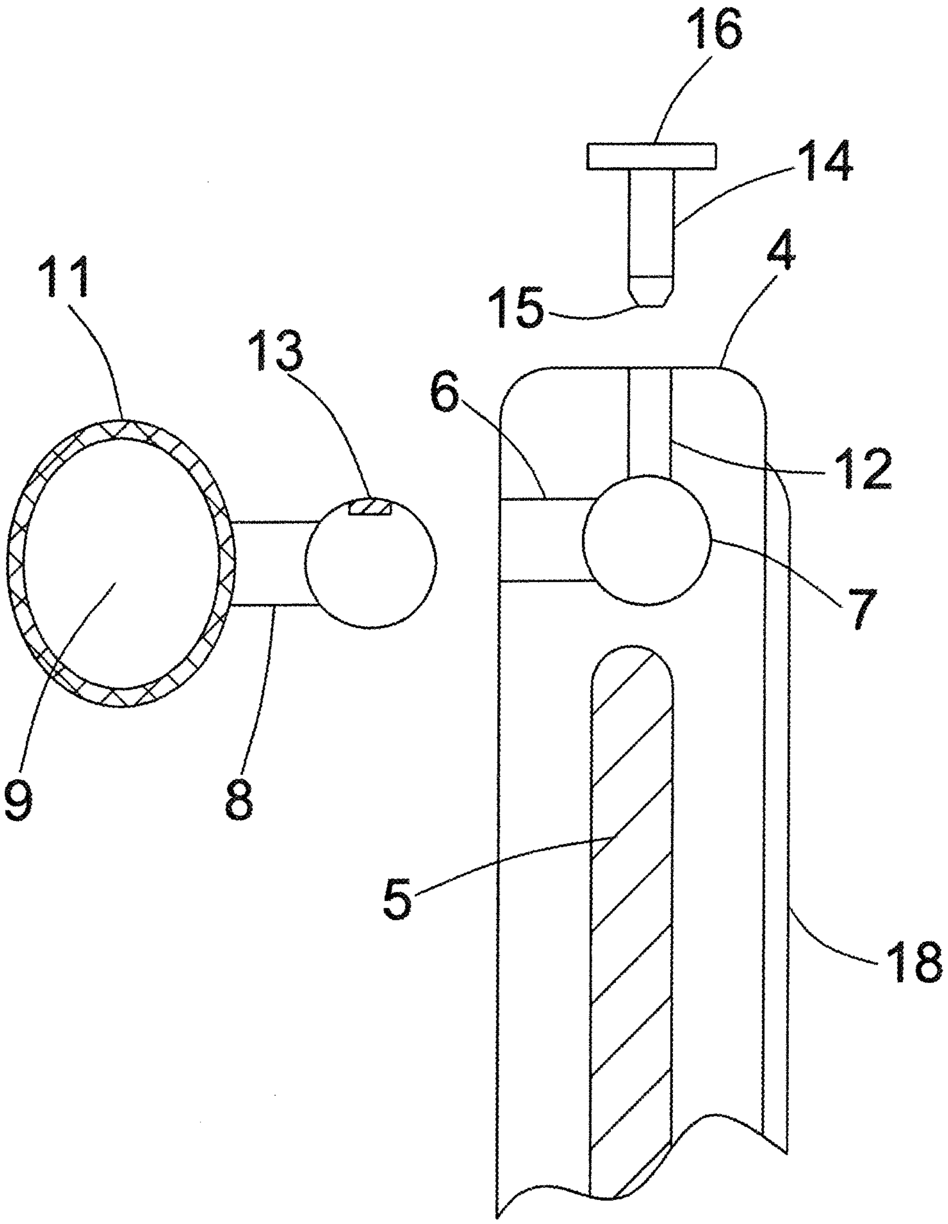
FIG. 3 s a left side view, in a sectioned form, showing, in an enlarged manner, a portion of a rubber bent rod shown in FIG. 1 according to the present invention.

To achieve the above objectives, the present invention provides the following technical solution. A bone conduction assistive hearing device comprises a main body. The main body comprises a hearing aid mechanism (1) and an adhesive layer (2). One side of the adhesive layer (2) has one or more ventilation holes (3) that penetrate through the adhesive layer (2). A bottom end of the adhesive layer (2) is provided with a rubber bent rod (4). A tough, flexible metal wire (5) is arranged and embedded in an interior of the rubber bent rod (4). One end of the rubber bent rod (4) is provided with a docking hole (6), and a spherical hole (7) arranged at one end of the docking hole (6). The docking hole (6) receives an elastic column (8) to insert therein. One end of the elastic column (8) is provided with an elastic ball (9), which is receivable in the spherical hole (7). The other end of the elastic column (8) is provided with a rubber plug (10), which has an outer side on which a breathable mesh layer (11) is arranged to cover the rubber plug (10). A top end of the rubber bent rod (4) is formed with a threaded hole (12), which communicates with the spherical hole (7). A top end of the elastic ball (9) is formed with a docking groove (13). The threaded hole (12) receives a bolt (14) to insert therein and engage therewith.

In the instant embodiment, a bottom end of the bolt (14) is provided with a cone or tapered head (15) for contacting and pressing against the docking hole (6). The cone head (15) at the bottom end of the bolt (14) is insertable into the docking groove (13) in the top end of the elastic ball (9) in order to improve an effect of fastening.

In the instant embodiment, a top end of the bolt (14) is provided with a rubber cap (16), and an adhesive layer is arranged between the rubber cap (16) and the bolt (14). The adhesive layer facilitates the fixation of the rubber cap (16) and prevents the wearer or other persons from directly hitting the bolt (14), thus avoiding injury.

In the instant embodiment, an insulation sleeve (17) is provided between the adhesive layer (2) and the hearing aid mechanism (1) in order to enhance an effect of insulating.

In the instant embodiment, the bolt (14) is coated with an anti-corrosion coating in order to improve corrosion resistance thereof.

In the instant embodiment, a reflective strip (18) is provided on an outer side of the rubber bent rod (4) to help a user to locate the device in dimly lit environments.

In summary, to use the bone conduction assistive hearing device, a user positions the docking groove (13) of the elastic ball (9) upward and then inserts the elastic ball (9) into the docking hole (6) by allowing the elastic ball (9) to be compressed and shrink for penetrating into and passing through the docking hole (6) to get into the spherical hole (7) from the docking hole (6), while making the elastic column (8) inserted in the docking hole (6). The bolt (14) is threaded into the threaded hole (12) to have the bottom end of the bolt (14) moved into and engaging with the docking groove (13) in the top end of the elastic ball (9) to thus fix the elastic ball (9) in the spherical hole (7). The main body is attachable to the back of an ear of a wearer via the adhesive layer (2), and the hearing aid mechanism (1) is attached to a designated position on the head of the wearer. The hearing aid mechanism (1) comprises known components in bone conduction hearing aids, such as the vibrator assembly and battery, and is not described in detail herein. The rubber bent rod (4), as being grasped, can be moved to the front of the ear, and the flexible metal wire (5) functions to restore the shape of the rubber bent rod (4). The rubber plug (10) at one end of the elastic column (8) is positionable in the ear cavity, similar to positioning of an earphone. The breathable mesh layer (11) on the rubber plug (10) improves the ventilation effect, making the main body more securely fixed on the back of the ear. This prevents the device from loosening and falling off during movement, addressing the issues of poor adhesion and potential falling that exist in the known bone conduction hearing aids.

Although the embodiments of the present invention have been shown and described, it is understood by those skilled in the art that various modifications, alterations, replacements, and variations can be made without departing from the principles and spirit of the present invention. The scope of the present invention is defined by the appended claims and their equivalents.

I claim:

1. A bone conduction assistive hearing aid, comprising a main body, wherein the main body comprises a hearing aid mechanism (1) and an adhesive layer (2); one side of the adhesive layer (2) is formed with a ventilation hole (3), the ventilation hole (3) penetrating through the adhesive layer (2); a bottom end of the adhesive layer (2) is provided with a rubber bent rod (4), and a flexible metal wire (5) is arranged in an interior of the rubber bent rod (4); one end of the rubber bent rod (4) is provided with a docking hole (6), and a spherical hole (7) arranged at one end of the docking hole (6); an elastic column (8) is insertable into the docking hole (6), and one end of the elastic column (8) is provided with an elastic ball (9), such that the elastic ball (9) is receivable in the spherical hole (7); an opposite end of the elastic column (8) is provided with a rubber plug (10), and a breathable mesh layer (11) is arranged on an outer side of the rubber plug (10) such that the breathable mesh layer (11) covers the rubber plug (10); a top end of the rubber bent rod (4) is formed with a threaded hole (12), the threaded hole (12) communicating with the spherical hole (7); a top end of the elastic ball (9) is formed with a docking groove (13); and a bolt (14) is receivable in and engageable with the threaded hole (12).

2. The bone conduction assistive hearing aid according to claim 1, wherein a bottom end of the bolt (14) is provided with a tapered head (15), and the tapered head (15) contacts and abuts against the docking hole (6).

3. The bone conduction assistive hearing aid according to claim 2, wherein a top end of the bolt (14) is provided with a rubber cap (16), and an adhesive layer is provided between the rubber cap (16) and the bolt (14).

4. The bone conduction assistive hearing aid according to claim 3, wherein an insulating sleeve (17) is provided between the adhesive layer (2) and the hearing aid mechanism (1).

5. The bone conduction assistive hearing aid according to claim 4, wherein the bolt (14) is coated with an anti-corrosion coating.

6. The bone conduction assistive hearing aid according to claim 5, wherein an outer side of the rubber bent rod (4) is provided with a reflective strip (18).

* * * * *